United States Patent [19]

Whiteside, II

[11] Patent Number: 4,635,533
[45] Date of Patent: Jan. 13, 1987

[54] METHOD AND APPARATUS FOR ACCOMMODATING TEMPERATURE AND PRESSURE VARIATIONS IN TUBULAR CONDUITS

[75] Inventor: James D. Whiteside, II, Borger, Tex.

[73] Assignee: Phillips Petroleum Company, Bartlesville, Okla.

[21] Appl. No.: 733,155

[22] Filed: May 13, 1985

Related U.S. Application Data

[60] Continuation of Ser. No. 566,465, Dec. 28, 1983, abandoned, which is a division of Ser. No. 366,211, Apr. 7, 1982.

[51] Int. Cl.$^4$ ............................................... F15B 1/00
[52] U.S. Cl. .................................... 91/471; 285/187; 285/228
[58] Field of Search ............... 285/228, 187, 227, 114, 285/DIG. 1

[56] References Cited

U.S. PATENT DOCUMENTS

| | | | |
|---|---|---|---|
| 862,867 | 8/1907 | Eggleston | 417/390 |
| 2,348,833 | 5/1944 | Miller | 285/228 |
| 2,545,701 | 3/1951 | McCausland | 285/228 |
| 2,721,746 | 10/1955 | Schimdler | 285/228 |
| 3,889,985 | 6/1975 | Gartmann | 285/DIG. 1 |
| 4,099,746 | 7/1978 | Kontsch et al. | 285/187 X |
| 4,202,247 | 5/1980 | Hunkar et al. | 91/461 X |

FOREIGN PATENT DOCUMENTS 988639  4/1965  United Kingdom ............... 285/228

Primary Examiner—Edward K. Look
Attorney, Agent, or Firm—French and Doescher

[57] ABSTRACT

An improved universal expansion joint having counterthrust means for controlling pressure-induced expansion. Movable bellows means in the form of one or more expansible bellows or one or more contractile fluid power cylinders are disclosed for applying counterthrust force to the expansion joint. Means responsive to the pressure within the expansion joint or the temperature of or the strain on the conduit connected to the expansion joint are disclosed for applying the desired fluid pressure to the bellows means to achieve the proper counterthrust force. Also disclosed are a method of employing the improved expansion joint and a system in which the improved expansion joint is advantageously utilized.

6 Claims, 8 Drawing Figures

METHOD AND APPARATUS FOR ACCOMMODATING TEMPERATURE AND PRESSURE VARIATIONS IN TUBULAR CONDUITS

This is a continuation of application Ser. No. 566,465, filed Dec. 28, 1983, now abandoned, which is a division of application Ser. No. 366,211, filed Apr. 7, 1982.

The present invention relates generally to couplings for use in tubular conduits. More particularly but not by way of limitation, the present invention relates to tubular conduit couplings for accommodating elongation or contraction of coupled conduits in response to variations in pressure and/or temperature.

In the design of systems for handling the flow of fluids or fluidized solids, it is often necessary to provide tubular couplings interconnecting tubular conduits which can accommodate variations in length of the coupled conduits caused by variations in temperature, variations in pressure, vibration, seismic shock, etc. or any combination of two or more of these phenomena. As in any engineering design, such couplings present physical limitations which necessitate engineering compromises. One such engineering compromise occurs in systems wherein heated fluids under pressure must be accommodated by such couplings. Such couplings ordinarily accommodate, by contraction, the linear expansion of a conduit when heated from a cold state to a higher operating temperature and, conversely, accommodate, by expansion, increasing internal pressure in the conduit. Under certain circumstances, it is necessary to limit or counterbalance expansion of such a coupling under increasing pressure to permit contraction of the coupling under increasing temperature.

Accordingly, it is an object of the invention to provide an improved movable coupling between a first tubular conduit and a second tubular conduit.

Another object of the present invention is to provide an improved tubular coupling which will accommodate both increased pressure and temperature in a tubular conduit in which it is installed.

Yet another object of the present invention is to provide a pressure-compensated tubular conduit which is simple in construction and reliable in operation.

The present invention contemplates apparatus for providing a movable coupling between a first conduit and a second conduit for conveying a pressurized fluid. The apparatus includes a first bellows means in fluid flow communication between the first conduit and the second conduit for conveying the pressurized fluid and providing means for movement between the first conduit and the second conduit including longitudinal movement along a first longitudinal axis in response to forces applied thereto, including the pressure of the pressurized fluid conveyed thereby while maintaining the fluid flow communication. The apparatus also provides second bellows means located near the first bellows means and having a first portion and a second portion, with the first and second portions being longitudinally movable relative to one another along a second longitudinal axis substantially parallel to the first longitudinal axis in response to the application of fluid pressure thereto. The apparatus further includes first connecting means securing the first portion of the second bellows means to the first conduit for preventing relative longitudinal motion between the first conduit and the first portion of the second bellows means. The apparatus also includes second connecting means securing the second portion of the second bellows means to the second conduit for limiting longitudinal movement of the second conduit away from the second portion of the second bellows means to a predetermined maximum. The first and second connecting means of the apparatus mutually cooperate so that movement of the first portion of said second bellows means relative to the second portion of the second bellows means in a first direction along the second longitudinal axis results in a corresponding longitudinal contraction of the first bellows means when the first bellows means is fully extended, and, alternately, so that a longitudinal extension of the first bellows means results in a corresponding movement of the first portion of said second bellows means relative to the second portion of the second bellows means in an opposite second direction along the second longitudinal axis. The apparatus also includes actuator means communicating between the second bellows means and one of the first bellows means or the first conduit for causing the application of a proper amount of fluid pressure to the second bellows means so that the first and second portions of the second bellows means are urged to move relative to one another along the second longitudinal axis with an amount of force sufficient to prevent the extension of the first bellows means in response to one of the temperature of the first conduit or the strain on the first conduit or the pressure of the pressurized fluid conveyed through the first bellows means.

Other aspects, advantages and objects of the present invention will be readily apparent to those skilled in the art upon study of the following detailed description of the various embodiments thereof with reference to the accompanying drawings in which.

Figure 1:
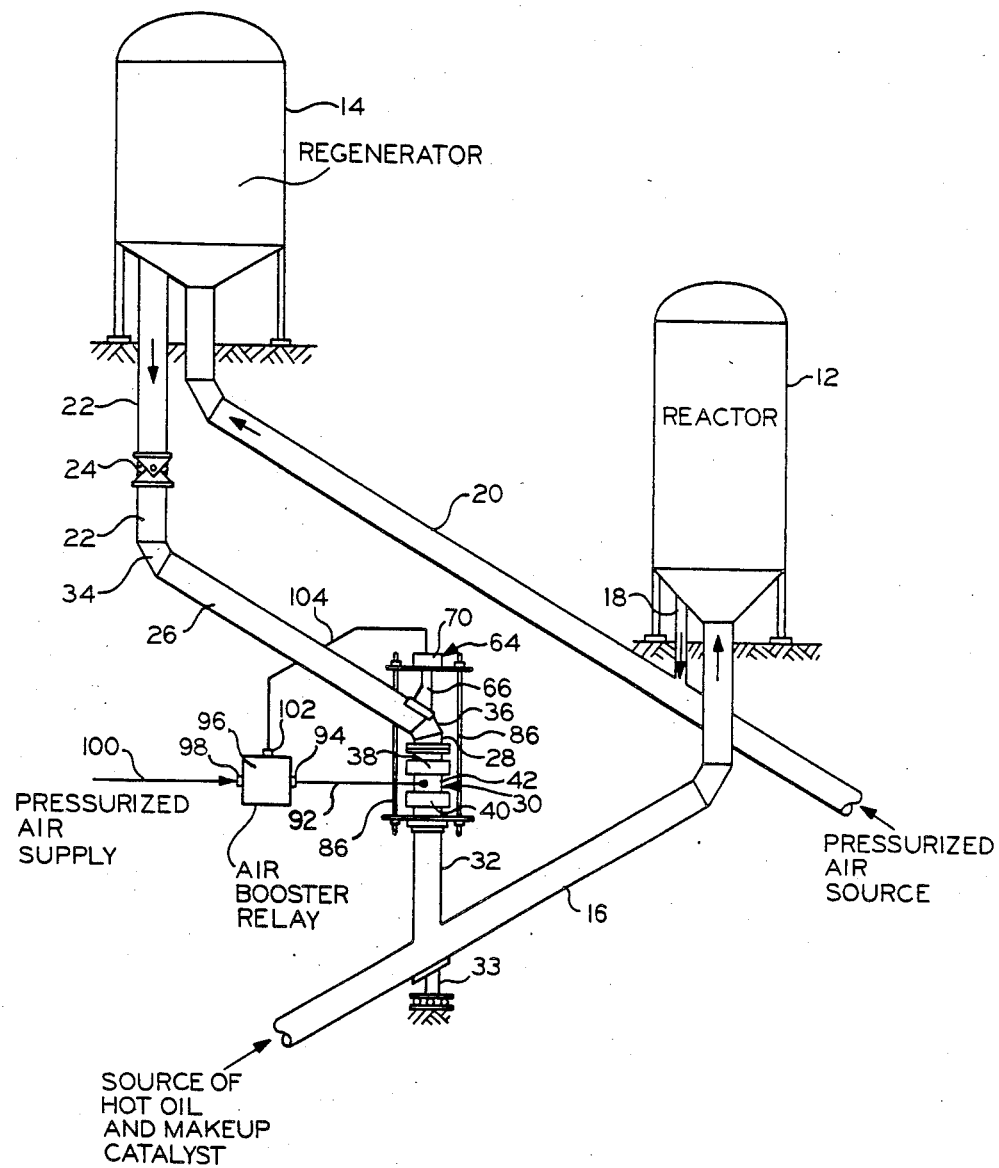
FIG. 1 is a schematic illustration of a system employing the present invention.
Figure 2:
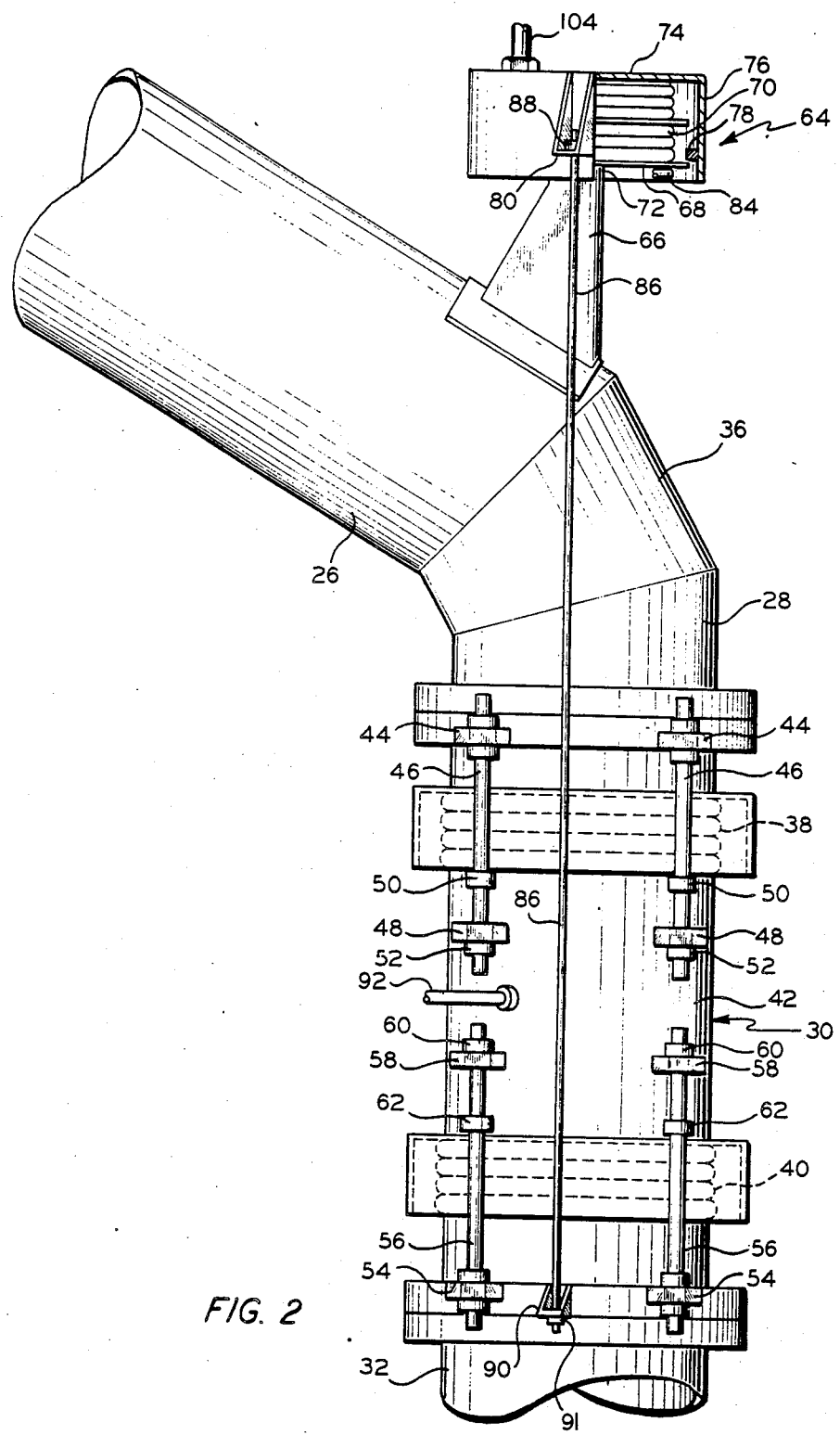
FIG. 2 is an enlarged partial front elevation view of the apparatus of FIG. 1 with portions broken away to more clearly illustrate the structure thereof.
Figure 3:
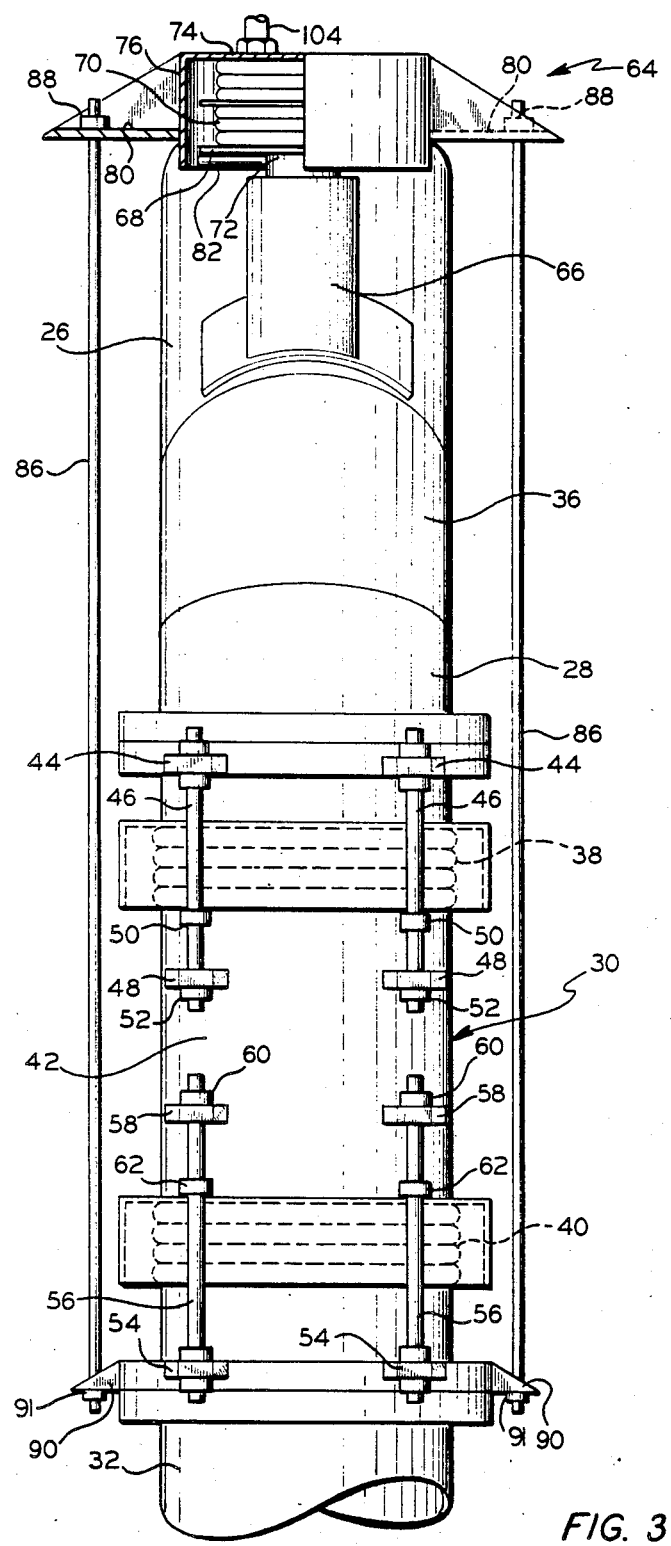
FIG. 3 is an enlarged partial right side elevation view of the apparatus of FIG. 1 with portions broken away to more clearly illustrate the structure thereof.

Referring now to the drawings, and to FIGS. 1, 2 and 3 in particular, FIG. 1 schematically illustrates a typical system employing the present invention. The system is in the form of a fluid catalytic cracking unit comprising a fluid catalytic cracking reactor 12 and a catalyst regenerator 14. A mixture of catalyst and hot oil to be cracked is introduced into the lower end of the reactor 12 via a suitable conduit 16. A portion of the spent catalyst in the reactor 12 is continuously removed from the lower portion thereof via conduit 18. This thus removed catalyst is conducted from the conduit 18 into the lower end of the regenerator 14 by means of air propulsion from a pressurized air source via conduit 20. Within the regenerator 14, the spent catalyst is subjected to carefully controlled conditions of temperature, oxygen content and circulation to burn off coke deposits on the catalyst and thereby reactivate the catalyst. The reactivated catalyst is withdrawn from the lower portion of the regenerator 14 via generally vertically downwardly extending conduit 22. Conduit 22 is typically provided with a pivoting flexible joint 24 interposed therein. The lower end of the conduit 22 is rigidly connected in fluid flow communication with the upper end of a conduit 26 which extends downwardly and outwardly from the lower end of the conduit 22. The lower end of the conduit 26 is rigidly connected in fluid flow communication with the upper end of a generally vertically downwardly extending conduit 28. The lower end of conduit 28 is connected in fluid flow communication with the upper end of bellows means in the form of a universal expansion joint 30. The lower end of the universal expansion joint 30 is connected in fluid flow communication with the upper end of a generally vertically downwardly extending conduit 32. The lower end of conduit 32 is connected in fluid flow communication with conduit 16. Conduits 22, 26, 28 and 32, as well as flexible joint 24 and universal expansion joint 30 provide standpipe means through which regenerated catalyst discharged from the regenerator 14 is reintroduced into the stream of hot oil and make up catalyst flowing through conduit 16 to reactor 12. The pivoting flexible joint 24 supports at least a portion of the weight of the standpipe means at a fixed first elevation. The conduit 32 is supported by a suitable structure 33 at a fixed second elevation.

In a typical system as illustrated in FIGS. 1, 2 and 3, the conduits 22, 26, 28 and 32 have a nominal outside diameter of about 42 inches (107 cm.) and a nominal inside diameter of about 40 inches (102 cm.) and are covered with suitable thermal insulation having a nominal thickness of about 4 inches (10 cm.), which insulation is omitted from the drawings.

The pivoting, flexible joint 24 and universal expansion joint 30 function together to permit the standpipe means to accommodate extension and contraction or compression thereof in response to changes in temperature and pressure to which the standpipe means may be subjected during operation, and to accommodate vibration of the system during operation. The accommodation of extension, contraction and vibration is necessary to prevent the occurrence of bending moments at the elbows 34 and 36 formed respectively at the rigid junction between conduit 22 and conduit 26 and at the rigid junction between conduit 26 and conduit 28.

The universal expansion joint 30 comprises a tubular upper bellows 38, a tubular lower bellows 40 and a tubular intermediate spool piece 42. The cross sectional areas of the upper and lower bellows 38 and 40 are substantially equal. The upper end of the upper bellows 38 is secured in fluid flow communication with the lower end of conduit 28, and the lower end of the upper bellows 38 is secured in fluid flow communication with the upper end of spool piece 42. The lower end of spool piece 42 is secured in fluid flow communication with the upper end of the lower bellows 40, and the lower end of the lower bellows 40 is secured in fluid flow communication with the upper end of conduit 32.

A plurality of outwardly extending lugs 44, preferably 4 in number, are fixedly secured to and equally circumferentially spaced about the upper end of upper bellows 38. The upper end of each of a plurality of tie rods 46 is fixedly secured to a corresponding lug 44 and extends downwardly therefrom substantially parallel to the longitudinal axis of the expansion joint 30. The lower end of each tie rod 46 is slidingly received through an aperture in a corresponding lug 48 which is fixedly secured to and extends outwardly from the upper end portion of spool piece 42. Movement of each tie rod 46 relative to the corresponding lug 48 is mechanically limited by upper and lower ring lugs 50 and 52 fixedly secured to each tie rod 46 above and below the corresponding lug 48. The spacing between the ring lugs 50 and 52 provides means for positively limiting the maximum extension and contraction of the upper bellows 38.

In a similar manner, a plurality of outwardly extending lugs 54, preferably 4 in number, are fixedly secured to and equally circumferentially spaced about the lower end of lower bellows 40. The lower end of each of a plurality of tie rods 56 is fixedly secured to a corresponding lug 54 and extends upwardly therefrom substantially parallel to the longitudinal axis of the expansion joint 30. The upper end of each tie rod 56 is slidingly received through an aperture in a corresponding lug 58 which is fixedly secured to and extends outwardly from the lower end portion of the spool piece 42. Movement of each tie rod 56 relative to the corresponding lug 58 is mechanically limited by upper and lower ring lugs 60 and 62 fixedly secured to each tie rod 56 above and below the corresponding lug 58. The spacing between the ring lugs 60 and 62 provides means for positively limiting the maximum extension and contraction or compression of the lower bellows 40.

The universal expansion joint 30 is further provided with an extension limiting assembly 64 which provides means for selectively limiting the extension of the universal expansion joint 30 in response to the pressure of any pressurized fluid conveyed therethrough, such as the presurized fluid bearing regenerated catalyst from the regenerator 14. The assembly 64 comprises a support bracket 66 which is fixedly secured by suitable means, such as welding, to the top side of the lower end portion of conduit 26 in general alignment with the coaxial longitudinal axes of conduits 28 and 32 and universal expansion joint 30. The lower end 68 of bellows means in the form of an expansible bellows 70 is fixedly secured by suitable means, such as welding, to the upper end 72 of the support bracket 66. The upper end 74 of the bellows 70 is fixedly secured by suitable means, such as welding, to a cylindrical wall 76 which extends downwardly therefrom to a point a distance below the lowermost portion of the lower end 68 of the bellows 70. At least two limiting lugs 78 are fixedly secured to the inside surface of the cylindrical wall 76 by suitable means, such as welding, at positions above the lower end 68 of the bellows 70 and are sized and shaped to engage the lower end 68 of the bellows 70 upon contraction of the bellows 70 to positively limit the amount of such contraction or compression to a predetermined maximum. A pair of brackets 80 are fixedly secured to the outside surface of the cylindrical wall 76 at diametrically opposed locations by suitable means such as welding. The cylindrical wall 76 is braced by a pair of rigid parallel horizontal transverse members 82 and 84 disposed on opposite sides of the upper end 72 of the support bracket 66 and extending between the locations of the brackets 80 on the wall 76. The opposite ends of the members 82 and 84 are fixedly secured to the cylindrical wall 76 by suitable means such as welding. The rigid members 82 and 84 perform the dual functions of reinforcing the wall 76 at the locations of the brackets 80 an positively limiting the amount of extension of the bellows 70 to a predetermined maximum.

The upper end portion of each of a pair of tie rods 86 is slidingly received through an aperture in a corresponding one of the brackets 80. A limiting lug 88 is fixedly secured to the upper end portion of each rod 86 above the corresponding bracket 80 by suitable means, such as welding, to prevent withdrawal of each tie rod 86 from the corresponding bracket 80. The lower end portion of each rod 86 is slidlingly received through an aperture in a corresponding lug 90 which is fixedly secured by suitable means, such as welding, to and extends outwardly from the lower end of lower bellows 40. A limiting lug 92 is fixedly secured to the lower end portions of each tie rod 86 below the corresponding bracket 90 by suitable means, such as welding, to prevent withdrawal of each tie rod 86 from the corresponding bracket 90. The tie rods 86 are preferably installed with the upper bellows 38 and the lower bellows 40 of the universal expansion joint 30 fully extended and with the bellows 70 of the extension limiting assembly 64 fully compressed or contracted, i.e. with the plate defining the lower end 68 of the bellows 70 in abutting engagement with the limiting lugs 78. The upper limiting lugs 88 are then secured, as by welding, to the upper end portion of the tie rods 86 above the brackets 80. The tie rods are then suspended from the brackets 80 by means of the lugs 88 and the lower limiting lugs 92 are secured, as by welding, to the lower end portions of the tie rods 86 below and as close as possible to the brackets 90.

As shown in FIG. 1, a conduit 92 provides fluid flow communication between the interior of the spool piece 42 of the universal expansion joint 30 and the control port 94 of a suitable regulated gas pressure supply device such as, for example, an air booster relay 96. The inlet port 98 of the air booster relay 96 is in fluid flow communication with a suitable source of pressurized air by means of a conduit 100. The outlet port 102 of the air booster relay 96 is in fluid flow communication with the interior of the expansible bellows 70 of the extension limiting assembly 64 by means of a conduit 104.

In the system illustrated in FIG. 1, the static load applied to the universal expansion joint 30 by the conduits 22, 26 and 38, elbows 34 and 36, insulation disposed about the conduits and elbows, and catalyst within the conduits and elbows during system operation is calculated, and will be referred to herein as $L_s$. The weight of the extension limiting assembly 64 supported by the conduit 26 is preferably ignored in this calculation thus providing a safety factor in the operation of the counter thrust apparatus of the extension limiting assembly 64. The cross sectional area of the upper bellows 38 (substantially equal to the cross sectional area of the lower bellows 40) is determined and will be referred to herein as $A_1$. The working pressure within the universal expansion joint 30 is determined and will be referred to herein as $P_1$. The cross sectional area of the expansible bellows 70 is determined and will be referred to herein as $A_2$. The air pressure applied by the air booster relay 96 through conduit 104 to the expansible bellows 70 is determined and will be referred to herein as $P_2$. To achieve the desired counterthrust pressure compensation by the extension limiting assembly 64, the aforementioned values of pressures, areas and static load force are related by the following equation:

$$L_s + P_2 A_2 = P_1 A_1$$

In a typical system as illustrated schematically in FIG. 1, the static load $L_s$ is about 12,700 $lb_f$ (5797 kg); the working pressure $P_1$ is about 28 psig (193 kPa); the cross sectional area $A_1$ is about 1,772 in$^2$ (11,433 cm$^2$); the counterthrust pressure $P_2$ is about 40.6 psig (279.9 kPa); and the cross sectional area of the counterthrust bellows $A_2$ is about 908 in$^2$ (5858 cm$^2$).

The above-described structure permits the universal expansion joint 30 to contract or become compressed to accommodate the thermal expansion of the catalyst regenerator stand pipe means when the system is started up, but prevents excessive expansion of the universal expansion joint 30 under the influence of the working pressures applied thereto, thus protecting the elbow 34 from damage.

Figure 4:
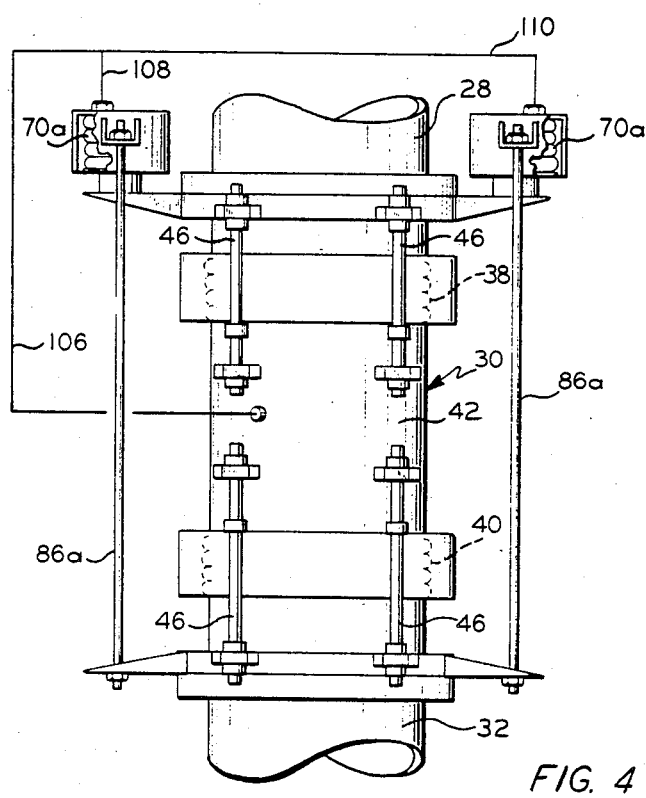
FIG. 4 is an enlarged partial elevation view similar to FIG. 3 illustrating another embodiment of the present invention with portions broken away to more clearly illustrate the structure thereof.

It will be understood that other embodiments of the apparatus of the present invention can be employed advantageously. For example, FIG. 4 illustrates a modified extension limiting system employing bellows means in the form of a pair of expansible bellows 70a disposed on opposite sides of the upper end of the upper bellows 38, each secured by two tie rods 86a. The cross sectional areas of the expansible bellows 70a are equal, and the total cross sectional area $A_2$ of the two expansible bellows 70a may be greater than, less than or equal to the previously discussed cross sectional area $A_1$ of the upper bellows 38. This embodiment finds application when a single expansible bellows cannot be expeditiously mounted in coaxial alignment with the universal expansion joint 30.

FIG. 4 also provides an alternate gas pressure application system which is equally applicable to the system configuration shown in FIGS. 1, 2 and 3. By selecting two expansible bellows 70a having a total cross sectional area $A_2$ selected in accordance with the equation set forth above, a suitable counterthrust effect can be obtained by connecting the interior of spool piece 42 in fluid flow communication with the interiors of both bellows 70a via conduits 106, 108 and 110.

Figure 5:
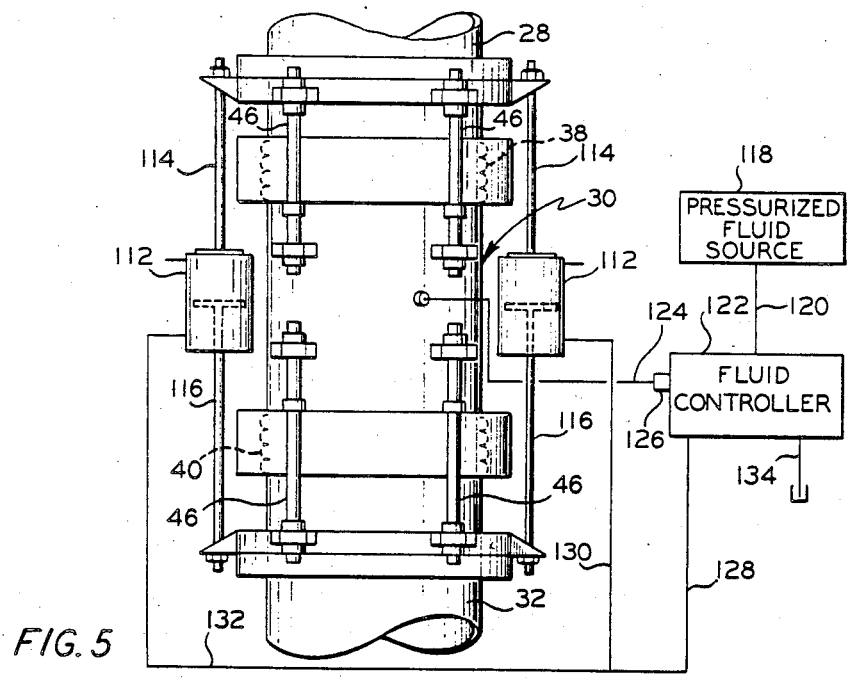
FIG. 5 is an enlarged elevation view similar to FIG. 4 of still another embodiment of the present invention.

FIG. 5 illustrates another form of pressure counterbalance system in accordance with this invention wherein bellows means in the form of a pair of single acting fluid power cylinders 112, either hydraulic or pneumatic, are disposed on opposite sides of the universal expansion joint 30, with the upper end of each power cylinder 112 connected to the upper end of upper bellows 38 via a tie rod 114 and with the lower end of each power cylinder 112 connected to the lower end of lower bellows 40 via a tie rod 116. A suitable source of pressurized power fluid 118 is connected via a conduit 120 to the inlet port of a suitable pilot operated fluid controller 122. Conduit 124 provides fluid flow communication between the interior of the spool piece 42 and the pilot port 126 of the fluid controller 122. The outlet port of the fluid controller 122 is connected in fluid flow communication to the rod ends of the power cylinders 112 via conduits 128, 130 and 132. The vent port of the fluid controller 122 is connected via conduit 134 to a suitable tank or other fluid return means if, for example, a liquid is employed, or may be vented to atmosphere if air is employed as the power fluid. In response to the pilot pressure $P_1$ from within the spool piece 41, the fluid controller 122 provides fluid at a pressure $P_2$ to the rod ends of the two power cylinders 112, which have a total piston cross sectional area $A_2$, in accordance with the previously described equation wherein $A_1$ is the cross sectional area of the upper bellows 38 and $L_s$ is the static load applied to the universal expansion joint 30 by the standpipe means thereabove.

Figure 6:
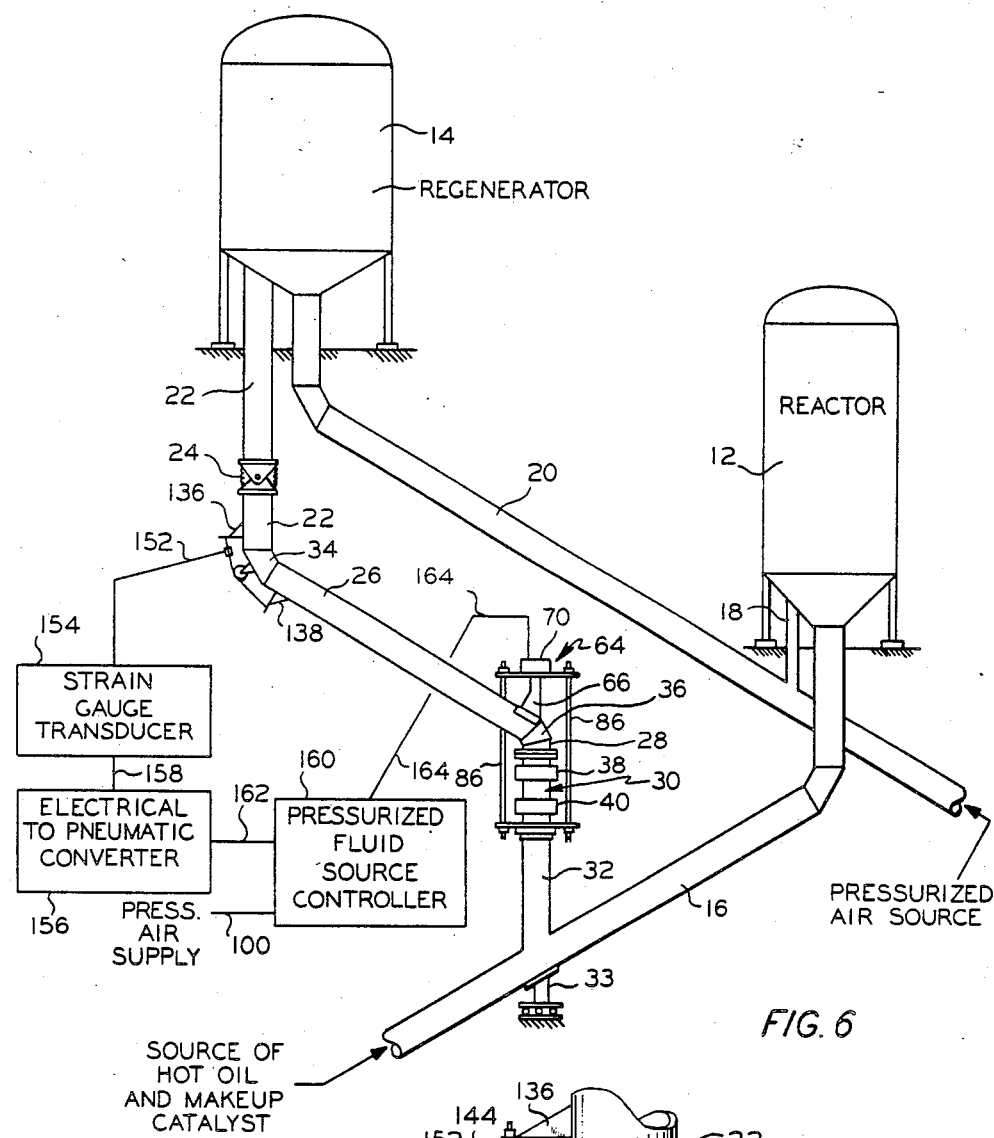
FIG. 6 is a schematic illustration similar to FIG. 1 illustrating yet another embodiment of the present invention.
Figure 7:
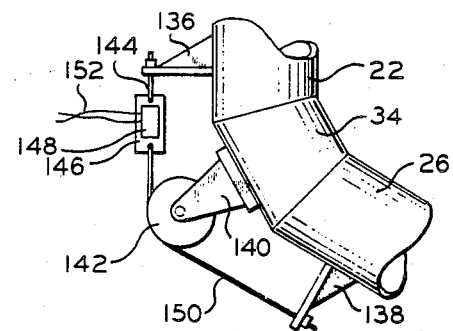
FIG. 7 is an enlarged partial elevation view of a portion of the structure of FIG. 6 more clearly illustrating the mounting of the strain gauge thereon.
Figure 8:
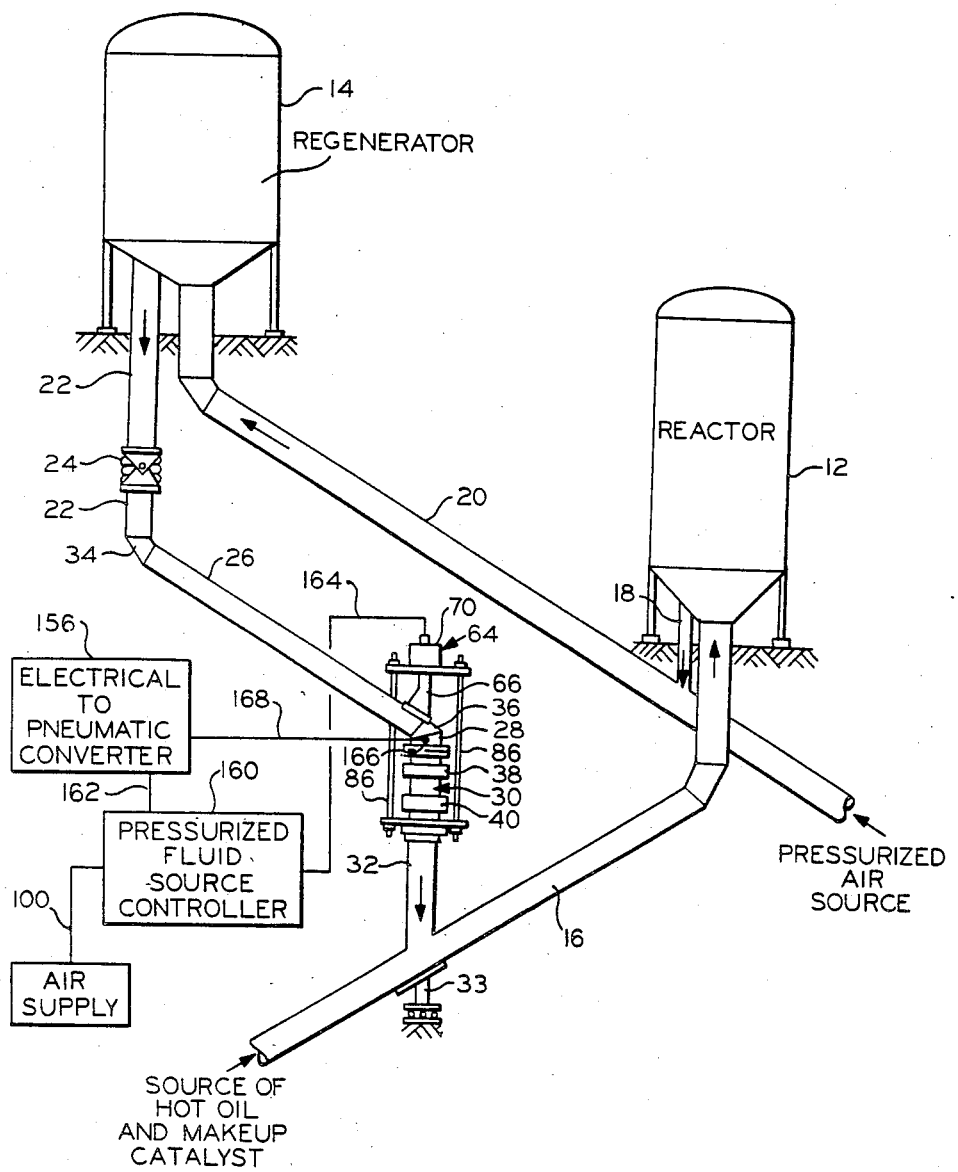
FIG. 8 is a schematic illustration similar to FIG. 6 illustrating still another embodiment of the present invention.

FIGS. 6 and 7 schematically illustrate another form of pressure counterbalance system in accordance with the instant invention. In this system, lugs 136 and 138 are mounted respectively on conduits 22 and 26 immediately above and below conduit elbow 34. A bracket 140 is mounted on the elbow 34 intermediate the lugs 136 and 138 and carries a pulley 142 journaled thereon. A wire 144 extends from lug 136 to the upper end of a steel plate 146 upon which is mounted a strain gauge 148. The lower end of the plate 146 is connected via wire 150 over pulley 142 to lug 138. The wires 144 and 150 are preferably formed of invar or chromel metal alloy. The steel plate 146 can be suitably formed of a piece of ½-inch carbon steel plate large enough to conveniently receive the strain gauge 148 thereon, which strain gauge may suitably be a surface strain gauge. A pair of electrical lead wires 152, preferably in the form of a coaxial cable, extend from the strain gauge 148 to a suitable strain gauge transducer 154, which transducer senses any variation in electrical resistance across the strain gauge 148 occasioned by strain experienced at the conduit elbow 34 and provides an electrical signal output responsive thereto to a suitable electrical to pneumatic converter 156 via electrical conduit 158. The converter 156 provides a pressurized gas, preferably air, pilot signal responsive to the electrical input signal thereto to the pilot port of a suitable controller 160 of a source of pressurized gas, preferably air, via a conduit 162. The controller 160, such as an air relay, provides pressurized fluid, for example a pressurized gas, preferably air, at a desired pressure to bellows means in the form of the expansible bellows 70 in response to the pressurized gas pilot signal via conduit 164. This system is calibrated and adjusted to continuously provide the desired gas pressure to the counterthrust expansible bellows 70 which will maintain an initial strain set point of the strain gauge 148 at the value sensed by the strain gauge 148 when the elbow 34 and the rest of the regenerator standpipe means are cold before system start-up. The pressure $P_2$ applied to the counterthrust bellows 70 having a cross sectional area $A_2$ will be applied in accordance with the previously described equation:

$$L_s + P_2 A_2 = P_1 A_1.$$

It will be understood that the apparatus shown in FIGS. 6 and 7 can be utilized equally advantageously with the counterthrust mechanisms of FIGS. 4 and 5.

FIG. 7 schematically illustrates still another form of pressure counterbalance system in accordance with the instant invention. In the system of FIG. 7, suitable temperature sensing means, preferably in the form of a thermocouple 166, communicate with the wall of the conduit 28 proximate the upper end of the expansion joint 30 to sense the temperature of the conduit 28 and provide an electrical signal output representative thereof. A suitable electrical conductor 168 provides electrical connection between the thermocouple 166 and the electrical to pneumatic converter 156. Operation of the system of FIG. 7 is based on the fact that as the regenerator catalyst return standpipe means heats up from cold to hot during start-up of the system it will expand in length in proportion to its temperature. Therefore, if there is full operating pressure in the standpipe means and the standpipe means is cold, there will be no need to compensate with the counterthrust limiting assembly 64. However, when the stand pipe means is fully pressured to operating pressure and is simultaneously warming up to its hot operating temperature, a resulting expansion of the standpipe means must be accommodated. Such expansion must be accommodated by the universal expansion joint 30 which is fully expanded by the working pressure in the standpipe means or else damage, such as bending or breakage of the joint at the elbow 34, will be done to the standpipe means. For example, when the standpipe means is heated to one-half of its operating temperature, the universal expansion joint 30 must contract or be compressed to at least one-half of its maximum compression or contraction to accommodate this thermal expansion of the standpipe means. In the apparatus of FIG. 7, this is accomplished by sensing the temperature of the standpipe means with the thermocouple 166 and providing an electrical signal output representing this temperature to the converter 156 via electrical conductor 168, which converter 156, in turn, provides a pneumatic signal via conduit 162 to controller 160. The controller 160, in turn, provides pressurized fluid to the bellows means in the form of expansible bellows 70 via conduit 164 at a pressure sufficient to compress the universal expansion joint 30 an amount adequate to insure that the standpipe means is free to achieve one-half of its thermal expansion elongation without structural damage thereto. Similarly, when the full operating temperature of the standpipe means is sensed, the expansible bellows 70 is pressured sufficiently to insure that the universal expansion joint 30 accommodates the resulting full thermal expansion elongation of the standpipe means.

Again, it will be understood that the control system illustrated in FIG. 7 is equally applicable to all other counterthrust systems described and illustrated herein.

Changes may be made in the construction, combination and arrangement of parts or elements of the invention as heretofore set forth in the specification and shown in the drawings without departing from the spirit and scope of the invention as defined in and limited only by the following claims.

That which is claimed is:

1. A method of controlling the pressure-induced elongation along a first longitudinal axis of a movable coupling between a first conduit and a second conduit for conveying a pressurized fluid comprising:
   sensing at least one of (1) the temperature of said first conduit and (2) the strain on said first conduit, and providing a signal output representative thereof; and
   applying a counterthrust force along the longitudinal axis of said movable coupling opposing the pressure-induced elongation of said movable coupling by applying pressurized fluid from a source of the pressurized fluid other than any pressurized fluid within said movable coupling to bellows means located near said movable coupling in response to said signal output, said bellows means having first and second portions connected respectively to said first and second conduits and movable relative to one another along a second longitudinal axis substantially parallel to said first longitudinal axis.

2. A method in accordance with claim 1 wherein said second longitudinal axis is substantially coaxial with said first longitudinal axis.

3. A method of controlling the pressure-induced elongation along a first longitudinal axis of movable coupling between a first conduit and a second conduit for conveying a pressurized fluid comprising;

sensing the temperature of said first conduit;

providing a signal output representative of said thus sensed temperature; and applying a counterthrust force along the longitudinal axis of said movable coupling opposing the pressure-induced elongation of said movable coupling in response to said signal output, wherein said counterthrust force is applied by applying pressurized fluid from a source of pressurized fluid to bellows means located near said movable coupling, said bellows means having first and second portions connected respectively to said first and second conduits and movable relative to one another along a second longitudinal axis substantially parallel to said first longitudinal axis.

4. A method in accordance with claim 3 wherein said second longitudinal axis is substantially coaxial with said first longitudinal axis.

5. A method in accordance with claim 4 wherein said source of the pressurized fluid is other than any pressurized fluid within said movable coupling.

6. A method in accordance with claim 3 wherein said source of the pressurized fluid is other than any pressurized fluid within said movable coupling.

* * * * *